United States Patent [19]
Albers et al.

[11] Patent Number: 6,108,358
[45] Date of Patent: Aug. 22, 2000

[54] APPARATUS FOR MINIMIZING THE EFFECTS OF LASER INTENSITY REDUCTION AT COLD TEMPERATURES IN RING LASER GYROS

[75] Inventors: Steven C. Albers, Coon Rapids; Stephen M. Baker; Timothy J. Callaghan, both of Roseville; Lloyd W. Priddy, Mahtomedi, all of Minn.

[73] Assignee: Honeywell Inc., Minneapolis, Minn.

[21] Appl. No.: 09/170,532

[22] Filed: Oct. 13, 1998

[51] Int. Cl.$^7$ ........................................................ H01S 3/04
[52] U.S. Cl. .................................................. 372/34; 372/94
[58] Field of Search .......................... 372/94, 34; 356/350

[56] References Cited

U.S. PATENT DOCUMENTS

| | | | |
|---|---|---|---|
| 4,282,495 | 8/1981 | Ljung | 372/94 |
| 5,400,141 | 3/1995 | Albers et al. | 372/94 |
| 5,450,198 | 9/1995 | Killpatrick et al. | 372/94 |

*Primary Examiner*—Leon Scott, Jr.
*Attorney, Agent, or Firm*—Albert K. Kau

[57] ABSTRACT

A circuit for controlling the run current in a ring laser gyro includes circuitry for sensing temperature, supplying a current to the ring laser gyro and controlling the current supplied to the ring laser gyro and the current varies depending on the temperature. The current changes at predetermined temperature points.

11 Claims, 3 Drawing Sheets

APPARATUS FOR MINIMIZING THE EFFECTS OF LASER INTENSITY REDUCTION AT COLD TEMPERATURES IN RING LASER GYROS

BACKGROUND OF THE INVENTION

Ring laser gyros are made of a ring laser gyro block with mirrors at the ends of the block. Legs exist in the ring laser gyro block to create a passageway between the mirrors which laser beams travel through for the operation of a ring laser gyro. To create the laser beams in the legs of the ring laser gyro, a current is supplied which is called the run current. The run current is supplied to anodes of the ring laser gyro and travel through portions of the legs to the cathode of the ring laser gyro. The run current is required for operation of the ring laser gyro in supplying adequate power for lasing in the legs of the ring laser gyro. Ring laser gyros currently operate at a fixed run current. The fixed run current level is determined by numerous factors, but is typically set at 2 to 5 times the lasing threshold in order to provide adequate laser power in the ring laser gyro.

The run current is set at a fixed level to ensure that adequate power exists for the ring laser gyro to operate in all temperature environments. The typical temperature range that a ring laser gyro operates in is 85 degrees Celsius to –40 degrees Celsius. At lower temperatures, a larger amount of current is required for operation since the laser intensity decreases as the temperature decreases. Therefore, the run current was fixed at a higher level to accommodate the low temperature range. Though the operation continued to be satisfactory at these lower cold temperatures, the run current was set at an unnecessarily higher level than required for the higher temperatures.

The operation of a ring laser gyro is above 4 degrees Celsius ninety percent of a ring laser gyro's lifetime. Therefore, power is wasted at most of the ring laser gyro's life. Further, in addition to the waste of power, a higher power supply decreases the life of elements within the ring laser gyro such as the mirrors and the cathode due to the higher energy source that degrades these elements. As a result, it would be beneficial if the run current was decreased for the majority of a ring laser gyro's lifetime so that the projected lifetime of the gyro would be increased due to longer life of the ring laser gyro elements such as the mirrors and the cathode. It would be beneficial if the capability existed to control the run current so that it was variable depending on the temperature range that the ring laser gyro operated at so that energy, materials and money could be saved.

SUMMARY OF THE INVENTION

An apparatus for controlling the run current in a ring laser gyro includes the ability for sensing temperature, supplying a current to the ring laser gyro and controlling the current supplied to the ring laser gyro. The current varies depending on the temperature the ring laser gyro is operating at. The current changes at predetermined temperature points. After a certain temperature point is reached, the run current will be maintained at that maximum current level and will not be increase any further as this maximum current level is the highest current level required for the ring laser gyro to operate at any temperature beyond this temperature point.

DETAILED DESCRIPTION OF THE PRESENT INVENTION

Figure 1:
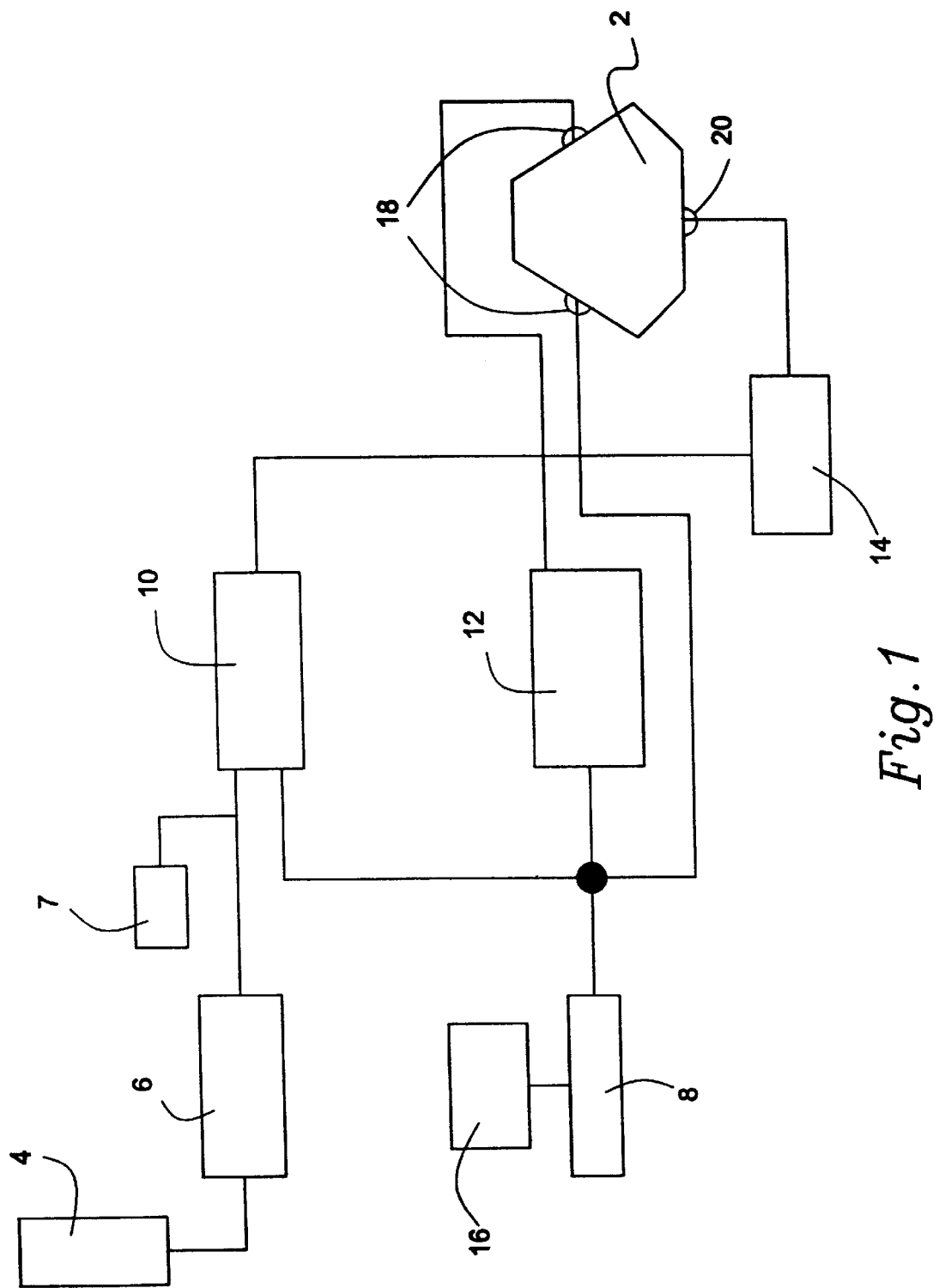
FIG. 1 shows a block diagram of the present invention.

The present invention utilizes multiple circuits to control the run current of a ring laser gyro 2 so that the run current is adjusted depending on the temperature. FIG. 1 shows a block diagram of the circuits used in the present invention. The circuits used are: a temperature sensor circuit 4, servo IT circuit 6, a reference voltage circuit 7, $R_{sense}$ 8, total current control circuit 10, differential current control circuit 12, and a run voltage circuit 14. As is known in this area of technology, a current is supplied, by a voltage supply 16 and $R_{sense}$ 8, to the anodes 18 of the ring laser gyro 2 for operation. The differential current control circuit 12 monitors the current supplied to the anodes 18 and adjusts the current supplied to the anodes 18 to ensure that the same amount of current is supplied to each anode 18 of the ring laser gyro 2. The current travels through the ring laser gyro 2 and exits the ring laser gyro 2 through the cathode 20 of the ring laser gyro 2. The total current control circuit 10 detects the voltage at $R_{sense}$ 8 and adjust the run voltage circuit 14 to maintain the proper gyro current. The run voltage circuit 14 is well known in this area of technology and will not be discussed any further. The improvement and advantage of the present invention over what is known in the area of technology is the ability to adjust the run current in relation to the temperature.

The temperature sensor circuit 4 of the present invention senses the temperature the ring laser gyro 2 is operating at. The sensed temperature is then sent to the servo IT circuit 6. The servo IT circuit 6 is set to operate at a predetermined set temperature set by its internal reference. Once this predetermined set temperature is sensed by the temperature sensor circuit 4, the servo IT circuit 6 increases the run current. As stated previously, at very low temperatures, a higher current is required for the operation of the ring laser gyro 2. Therefore, when the temperature drops below this certain set temperature, a higher run current will be required. The run current is increased by the servo IT circuit 6 by increasing the voltage over $R_{sense}$ 8 (a resistor arrangement) so that the current supplied to the anodes 18 will increase. The total current control circuit 10 operates by adjusting the run voltage so that the voltage at $R_{sense}$ 8 is equal to the reference voltage at the total current control circuit 10. The servo IT circuit 6 increases the run current by lowering the reference voltage to the total current control circuit 10 which in turn lowers the run voltage and increases the voltage across $R_{sense}$ 8. The run current will continue to be increased until a maximum level has been reached at a second set temperature. The run current will remain at this level while the ring laser gyro 2 is operating in the temperature range below the second set temperature.

An example will better illustrate the operation of the present invention. In this example, the total current control circuit 10 voltage is 12 volts and the run voltage is –460 volts. The voltage supply 16 will be set at supplying 15 volts and therefore, the voltage over $R_{sense}$ 8 will be 3 volts. Now, assume the temperature decreases and more run current is required. The run voltage will be decreased in order to increase the voltage over $R_{sense}$ 8 which increases the run current to the anodes 18 of the ring laser gyro 2. The servo IT 6 senses the need for a change based on the temperature and the total control circuit 10 voltage is lowered to 10 volts which in turn decreases the run voltage to −462 volts. The voltage supply 16 remains constant at 15 volts and therefore, the voltage over $R_{sense}$ 8 increases to 5 volts which increases the run current as a result.

Figure 2:
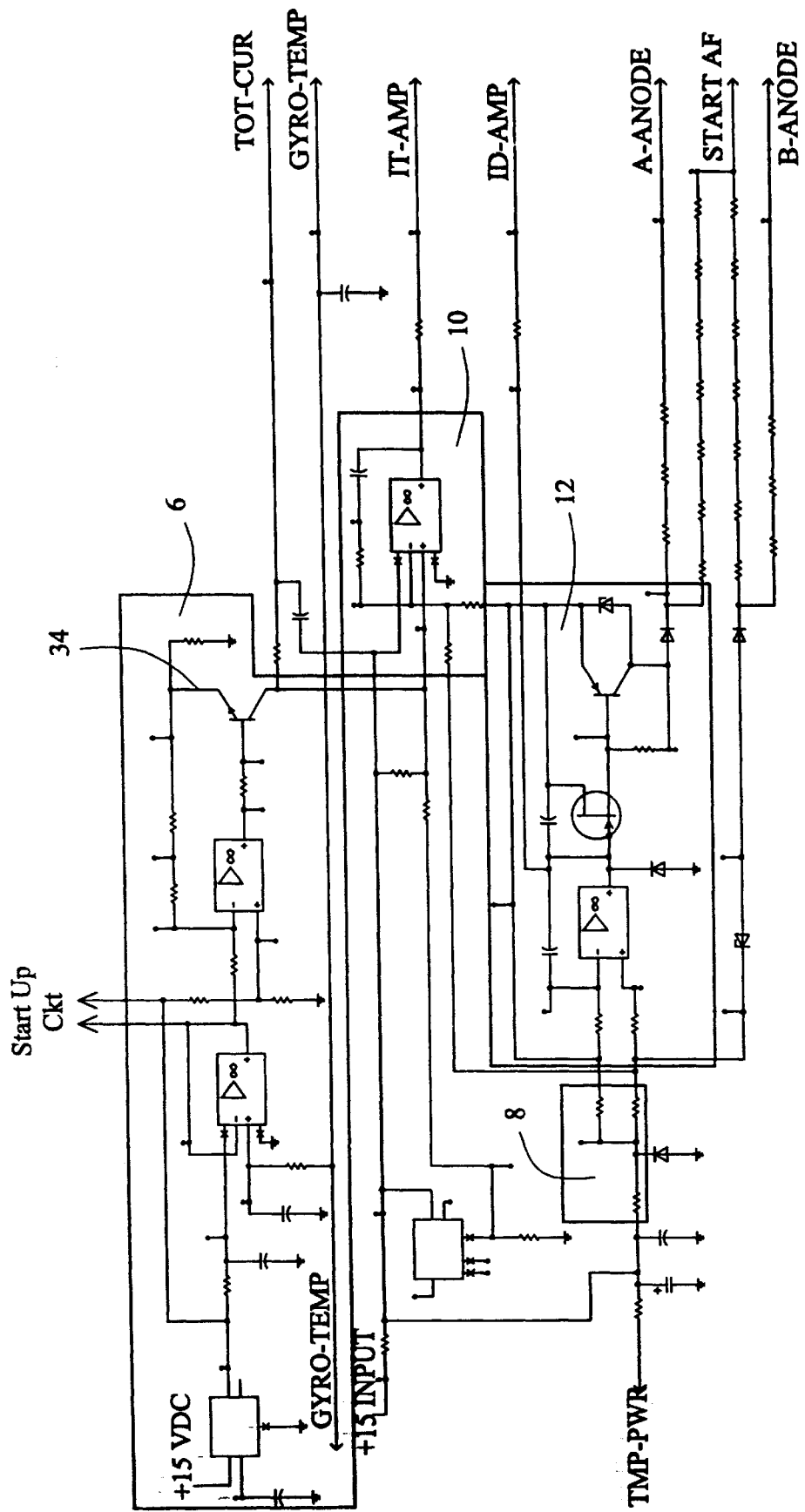
FIG. 2 shows a detailed schematic of the circuit diagram of the present invention.

The actual circuitry is shown in FIG. 2. It should be noted that the present invention is not limited to the specific disclosed circuit implementations, but that many other implementations can be used. Further, the present invention is not limited to analog implementations, but any element shown in FIG. 1 could be replaced with a digital implementation. The present invention is providing a structure with the capability to adjust run current taking into account the temperature the ring laser gyro is operating at. As long as this inventive concept is retained, many differing analog or digital implementations can be used. The specific circuit implementation described is the preferred embodiment and is used to disclose an example and not a limitation of a circuit implementation to realize the present invention.

The temperature sensor 4 is well known in this area of technology and will not be discussed in any further detail here. The temperature sensor 4 is connected to the servo IT 6. Specifically in the servo IT circuitry 6, the temperature sensor 4 is connected to a first operational amplifier 30 which is used as a buffer to prevent too much current from being drawn out of the temperature sensor 4. A second operational amplifier 32 is connected to the first operational amplifier 30. A transistor 34 is in turn connected to the second operational amplifier 32 to initiate the increase in the run current when required. These elements increase voltage which along with $R_{sense}$ 8 will increase the run current. $R_{sense}$ 8 and the increase in run current will be discussed later, but it should be understood that an increase in voltage will result in an increase in run current.

The second operational amplifier 32 is set at a first set level voltage which the ring laser gyro 2 operates at the majority of the time. Again, at lower temperatures, more current is required so the run current is increased by increasing the voltage. If the temperature goes below a first predetermined temperature which is a lower temperature, the second operational amplifier 32 "turns on" and in turn "turns on" the transistor 34 so that the voltage output out of the servo IT 6 is increased. The voltage continues to increase until a second predetermined temperature is reached in which a second set level voltage is maintained. The second set level voltage is the maximum level required for ring laser gyro operation regardless of how low the temperature becomes. The second operational amplifier 32 reaches a maximum voltage and no further voltage increase is output, but instead, the voltage is maintained at this second set level voltage. The increased voltage causes an increase in voltage over $R_{sense}$ 8 which will in turn draw more current from the voltage supply 16. As a result, the run current supplied to the anodes 18 of the ring laser gyro 2 will increase. The two current control circuits 10 and 12 discussed before are well known in this area of technology and will not be discussed in any further detail here. The present invention sets the run current at levels adequate for ring laser gyro operation at differing temperatures. As a result, only the necessary amount of current is supplied and money, energy, and materials is saved.

Figure 3:
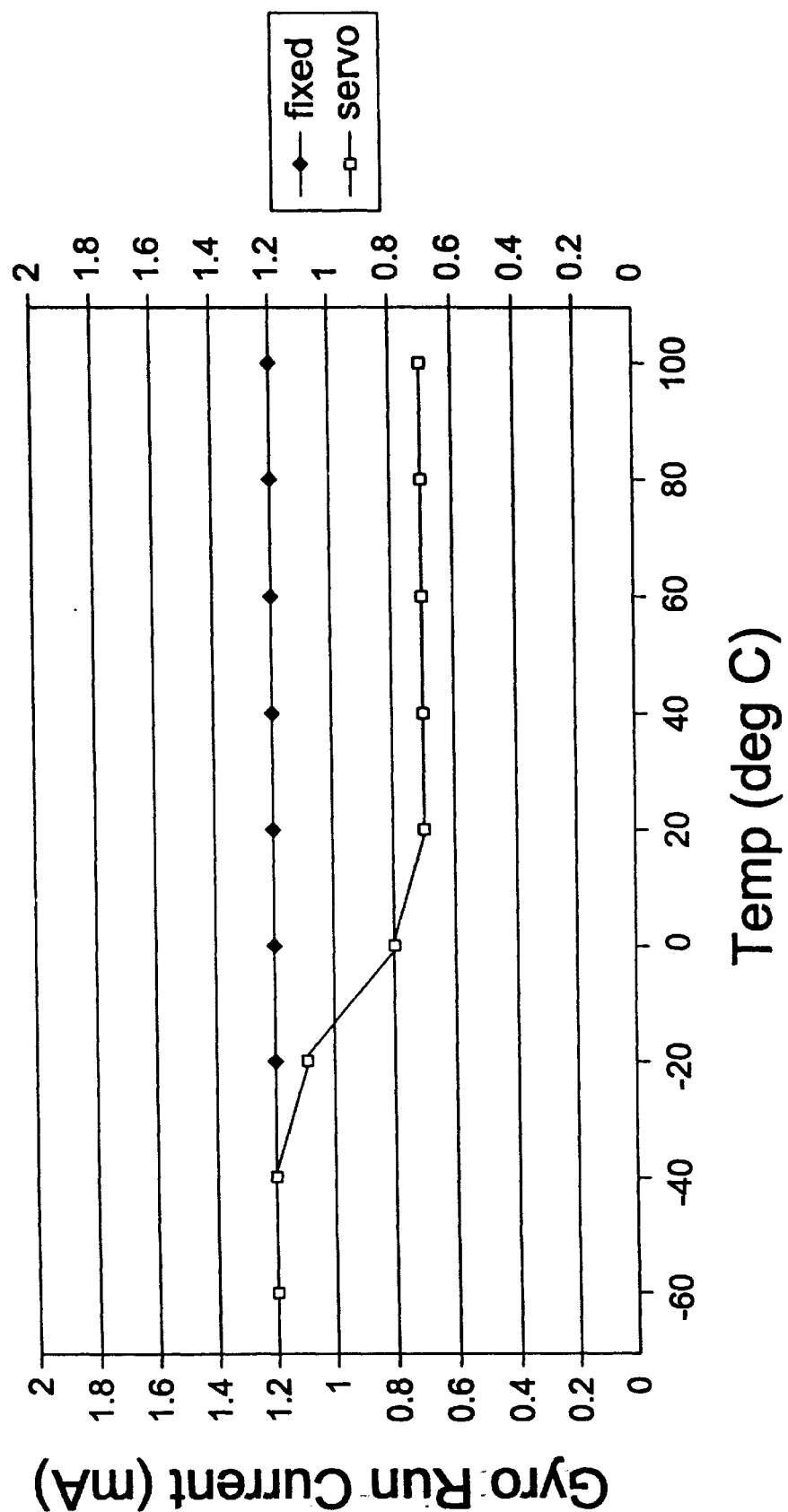
FIG. 3 shows a chart of values used in the specific embodiment of the present invention.

FIG. 3 shows an example of the operation of the present invention for clarification. The chart shows the previously fixed current supply as well as the use of the present invention with the servo IT 6 to control the current supply. As stated in the background of the invention, the current was previously supplied at a fixed level of 1.2 mA. In the present invention, the voltage supply 16 is set at supplying a current of approximately 0.7 mA. This run current level is the required level for the operation of the ring laser gyro 2 at temperatures above 4 degrees Celsius. As the temperature lowers, more current is required for the operation of the ring laser gyro 2. When the temperature sensor 4 senses 4 degrees Celsius, the servo IT 6 will increase the voltage over $R_{sense}$ 8 and thus, increase the current supplied to the anodes 18 of the ring laser gyro 2. As the temperature reaches −20 degrees Celsius and below, it is known that only 1.2 mA is required for the operation of the ring laser gyro 2 at these temperature levels. Once the temperature sensor 4 senses this temperature, the servo IT 6 will cease increasing the voltage over $R_{sense}$ 8 and keep it at a level so that 1.2 mA is supplied to the anodes 18 of the ring laser gyro 2. It is to be noted that the values for temperature and current are used for example purposes only and different temperature or current values can be used for different applications.

The invention has been described herein in detail in order to comply with the Patent Statutes and to provide those skilled in the art with the information needed to apply the novel principles and to construct and use such specialized materials and components as are required. However, it is to be understood that the invention can be carried out by specifically different materials, values, configurations and components, and that various modifications, as to the materials, values, configurations and components, can be accomplished without departing from the true scope of the invention itself.

The embodiments of the invention in which an exclusive property or right is claimed are defined as follows:

1. Apparatus for controlling current supplied to a ring laser gyro, comprising:
   means for sensing temperature;
   means for supplying a current to the ring laser gyro; and
   means for controlling the current by varying the current supplied when a first predetermined temperature is sensed during ring laser gyro operation.

2. The apparatus of claim 1 wherein the controlling means increases the current supplied when the first predetermined temperature is sensed.

3. The apparatus of claim 2 wherein the controlling means increases the current by increasing the voltage over a resistor configuration.

4. The apparatus of claim 2 wherein the controlling means ceases increasing the current supplied when a second predetermined temperature is sensed.

5. Apparatus for controlling current supplied to a ring laser gyro having anodes and a cathode, comprising:
   means for sensing temperature;
   means for supplying a current to the ring laser gyro;
   means for establishing that equal amounts of current are supplied to the anodes of the ring laser gyro;
   means for verifying that the current supplied to the ring laser gyro is a predetermined amount; and
   means for controlling the current by increasing the current supplied to the ring laser gyro during ring laser gyro operation when a first predetermined temperature is sensed.

6. The apparatus of claim 5 wherein the increasing means increases the current by increasing the voltage over a resistor configuration.

7. The apparatus of claim 5 wherein the increasing means ceases increasing the current supplied when a second predetermined temperature is sensed.

8. The apparatus of claim 5 wherein the increasing means is a circuit configuration comprising transistors and operational amplifiers.

9. A method for controlling the supply of current to a ring laser gyro, comprising the steps of:

1) sensing temperature the ring laser gyro is operating at; and 2) controlling the supply of current during ring laser gyro operation when a plurality of predetermined temperatures are sensed.

10. The method of claim 9, further comprising the step of:

3) increasing the supply of current if the sensed temperature equals a first predetermined temperature.

11. The method of claim 9, further comprising the step of:

4) maintaining the current supplied to the ring laser gyro when a second predetermined temperature is reached.

* * * * *